United States Patent
Csapo et al.

(10) Patent No.: US 8,190,145 B2
(45) Date of Patent: May 29, 2012

(54) APPARATUS AND METHOD FOR MOBILE STATION-ASSISTED OPTIMIZATION OF A WIRELESS NETWORK

(75) Inventors: John S. Csapo, Dallas, TX (US); Ronald J. Webb, Plano, TX (US); Philip Y. Sohn, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1332 days.

(21) Appl. No.: 10/744,226

(22) Filed: Dec. 22, 2003

(65) Prior Publication Data

US 2005/0136911 A1 Jun. 23, 2005

(51) Int. Cl.
*H04W 24/00* (2009.01)
*H04W 36/00* (2009.01)

(52) U.S. Cl. ............... 455/423; 455/404.2; 455/440

(58) Field of Classification Search .......... 455/421, 455/456.1, 456.5, 446, 436, 456.6, 435.1, 455/445, 412.1, 512, 518, 425, 423, 422, 455/404.2, 440, 414.2; 370/344
See application file for complete search history.

(56) References Cited

U.S. PATENT DOCUMENTS

| | | | | |
|---|---|---|---|---|
| 5,590,177 A * | 12/1996 | Vilmur et al. | ........... | 455/436 |
| 6,097,953 A * | 8/2000 | Bonta et al. | ........... | 455/436 |
| 6,223,032 B1* | 4/2001 | Cuffaro | ........... | 455/425 |
| 6,321,083 B1* | 11/2001 | Vaara et al. | ........... | 455/446 |
| 6,330,438 B1* | 12/2001 | McClelland et al. | ........... | 455/421 |
| 6,459,695 B1* | 10/2002 | Schmitt | ........... | 370/344 |
| 6,463,287 B1* | 10/2002 | Wegner | ........... | 455/456.1 |
| 6,516,195 B1* | 2/2003 | Zadeh et al. | ........... | 455/446 |
| 6,721,572 B1* | 4/2004 | Smith et al. | ........... | 455/456.1 |
| 6,970,721 B1* | 11/2005 | Gnesda et al. | ........... | 455/562.1 |
| 2002/0142788 A1* | 10/2002 | Chawla et al. | ........... | 455/504 |
| 2002/0198002 A1* | 12/2002 | Ghandeharizadeh et al. | | 455/456 |
| 2003/0013441 A1* | 1/2003 | Bhogal et al. | ........... | 455/423 |
| 2004/0203855 A1* | 10/2004 | Veerasamy et al. | ........... | 455/456.1 |
| 2005/0009521 A1* | 1/2005 | Preece | ........... | 455/435.1 |
| 2005/0020284 A1* | 1/2005 | Benco et al. | ........... | 455/456.6 |
| 2005/0107095 A1* | 5/2005 | Samuel | ........... | 455/456.5 |

* cited by examiner

*Primary Examiner* — Kiet Doan

(57) ABSTRACT

A radio frequency (RF) coverage server for use in a wireless network comprising base stations that communicate with mobile stations located in a coverage area of the wireless network. The RF coverage server receives from the mobile stations geographic location data indicating positions of the mobile stations when communication links to the wireless network were dropped. The RF coverage server identifies areas of good RF coverage and areas of poor RF coverage in the wireless network. The RF coverage server also identifies a first one of the mobile stations that frequently drops communication links to the wireless network when the first mobile station is disposed in the good RF coverage areas.

20 Claims, 4 Drawing Sheets

APPARATUS AND METHOD FOR MOBILE STATION-ASSISTED OPTIMIZATION OF A WIRELESS NETWORK

TECHNICAL FIELD OF THE INVENTION

The present invention generally relates to wireless networks and, more specifically, to systems and methods for automatically optimizing the performance of a wireless network using RF parameters retrieved from mobile stations in the coverage area of the wireless network.

BACKGROUND OF THE INVENTION

One of the key service quality issues of any wireless network is providing complete and reliable radio frequency (RF) coverage. This is accomplished by minimizing the number of RF holes in the coverage area of the wireless network. An RF hole is an area in which the forward channel signals transmitted by the base station or the reverse channel signals from the mobile station are severely degraded by terrain, buildings, vegetation, or any other object. When a wireless device (or mobile station) that is turned on, but idle, moves into an RF hole, service may be lost (i.e., the mobile station is dropped) because the mobile station cannot receive the pilot channel signal, the paging channel signal, the synchronization channel signal, or other control channel signal. The mobile station must reacquire the wireless network when the mobile station moves out of the RF hole. If the mobile station is on and active (i.e., handling a voice call or an Internet protocol (IP) data call), the mobile station may drop the call because the forward or reverse traffic channel signal is blocked.

Wireless services providers routinely monitor their wireless networks in order to detect RF holes. Conventional methods of improving RF coverage have relied on costly forms of maintenance. Wireless service providers rely on pre-commercial optimization of the system using test equipment and test drives and/or post-commercial optimization using test drives and regularly scheduled visits to the equipment sites. Service providers also use alarms and sensors within the fixed infrastructure equipment and reports generated by diagnostic software within the fixed infrastructure. Service providers also rely on complaints from subscribers about degradation of service. However, all of these methods have significant drawbacks.

Pre-commercial optimization of the system using test equipment and test drives occurs when the system is not loaded, so the system is optimized for conditions that practically never exist in normal operation. Such tests are static and cannot possibly account for different loading conditions. Also, pre-commercial optimization is often implemented on a sample area of the network and it is assumed that the rest of the system behaves similarly. This method is highly inaccurate and expensive.

Post-commercial optimization in an active system is very slow and costly. Post-commercial optimization is done with a limited number of mobiles and without a system-wide point-of-view. Traffic loads and patterns change rapidly, so that by the time the information is collected it may no longer be valid. Moreover, post-commercial optimization must be done with very small impact on service to subscribers. This limits the effectiveness of the process. Regularly scheduled maintenance visits to the equipment sites are very expensive and very slow.

The effectiveness of alarms and sensors in wireless network infrastructure equipment is limited by the exceeding complexity of many wireless networks. Monitoring only failures in the infrastructure is insufficient, since the alarms and sensors cannot measure the actual experience of the subscriber under normal operational conditions. Finally, waiting for customers to complain is not a good way to do business. Moreover, customer complaints are sporadic and seldom contain the detailed information needed to detect and correct a network coverage problem.

More recently, advanced mobile location services (e.g., mobile E911) have been developed to accurately determine the location of mobile stations (e.g., cell phones). Advantageously, service providers may use these location services to identify RF coverage holes. These location services generally fall into one of two categories: 1) handset-based techniques or 2) network-based techniques. Network-based techniques use mobile station locating equipment that is disposed in the network infrastructure (e.g., in a base station). Handset-based techniques use locating equipment (e.g., GPS receiver) that is disposed in the handset and transmit position data to the network.

However, unless the wireless service provider continuously monitors the location of all mobile stations, it is difficult to use that information to determine coverage holes. Continually monitoring the positions of all mobile stations also consumes an excessive amount of RF bandwidth and processing power in the base stations. Furthermore, network-based location devices determine mobile station location using principles of extrapolation (e.g., triangulation) that often prove inaccurate.

Finally, none of the handset-based or network-based techniques for monitoring the RF coverage of a wireless network are able to control for faults in the mobile station itself, rather than in the network. Mobile stations are often dropped even in areas of good RF coverage because the mobile station is defective, although still able to operate. When these mobile stations are dropped, it may lead to false reports of poor RF coverage in the wireless network.

Therefore, there is a need in the art for improved systems and methods for automatically optimizing the RF coverage in a wireless network. In particular, there is a need in the art for improved systems and methods for automatically identifying and correcting RF coverage holes in a wireless network. More particularly, there is a need in the art for RF coverage monitoring apparatuses and techniques that are capable of identifying faulty mobile stations that may generate false reports of RF coverage holes in a wireless network.

SUMMARY OF THE INVENTION

The present invention improves the RF coverage of a wireless network, reduces maintenance costs, and improves system quality by obtaining data from the mobile stations that access the wireless network. The data can be processed real-time or stored for post-processing. Based on data received from the mobile stations, transmission power and antenna steering can be automatically modified to eliminate or at least minimize an RF coverage hole. The present invention may also detect mobile stations that are operating out of performance standards and notify subscribers to replace those mobile stations before the mobile stations cause additional customer dissatisfaction.

The present invention takes advantage of the E911 requirements specified by the Federal Communications Commission (FCC) in conjunction with new RF reporting features implemented in the mobile station. The present invention also utilizes post or real-time processing algorithms that analyze the incoming data reports from the mobile stations. Statistics from thousands of calls per hour over a wide service area provide a rich source of data for determining RF coverage holes in the wireless network.

To address the above-discussed deficiencies of the prior art, it is a primary object of the present invention to provide a radio frequency (RF) coverage server for use in association with a wireless network comprising a plurality of base stations capable of communicating with mobile stations located in a coverage area of the wireless network. According to an advantageous embodiment, the RF coverage server is capable of receiving from the mobile stations geographic location data indicating positions of the mobile stations when communication links to the wireless network were dropped. The RF coverage server is capable of identifying areas of good RF coverage and areas of poor RF coverage in the wireless network. The RF coverage server is further capable of identifying a first one of the mobile stations that frequently drops communication links to the wireless network when the first mobile station is disposed in the good RF coverage areas.

According to one embodiment of the present invention, the RF coverage server determines that the first mobile station is faulty.

According to another embodiment of the present invention, the RF coverage server transmits an alert message to the first mobile station informing a user of the first mobile station that the first mobile station is faulty.

According to still another embodiment of the present invention, the RF coverage server transmits an alert message to an operator of the wireless network informing the operator that the first mobile station is faulty.

According to yet another embodiment of the present invention, the RF coverage server adjusts a transmit power of a first base station to reduce a size of a first one of the poor RF coverage areas.

According to a further embodiment of the present invention, the RF coverage server adjusts transmit powers of a first base station and a second base station to reduce a size of at least one of the poor RF coverage areas.

According to a still further embodiment of the present invention, the RF coverage server adjusts an electronic antenna of a first base station to perform beam steering in order to reduce a size of a first one of the poor RF coverage areas.

According to a yet further embodiment of the present invention, the RF coverage server adjusts electronic antennas of a first base station and a second base station to perform beam steering in order to reduce a size of at least one of the poor RF coverage areas.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
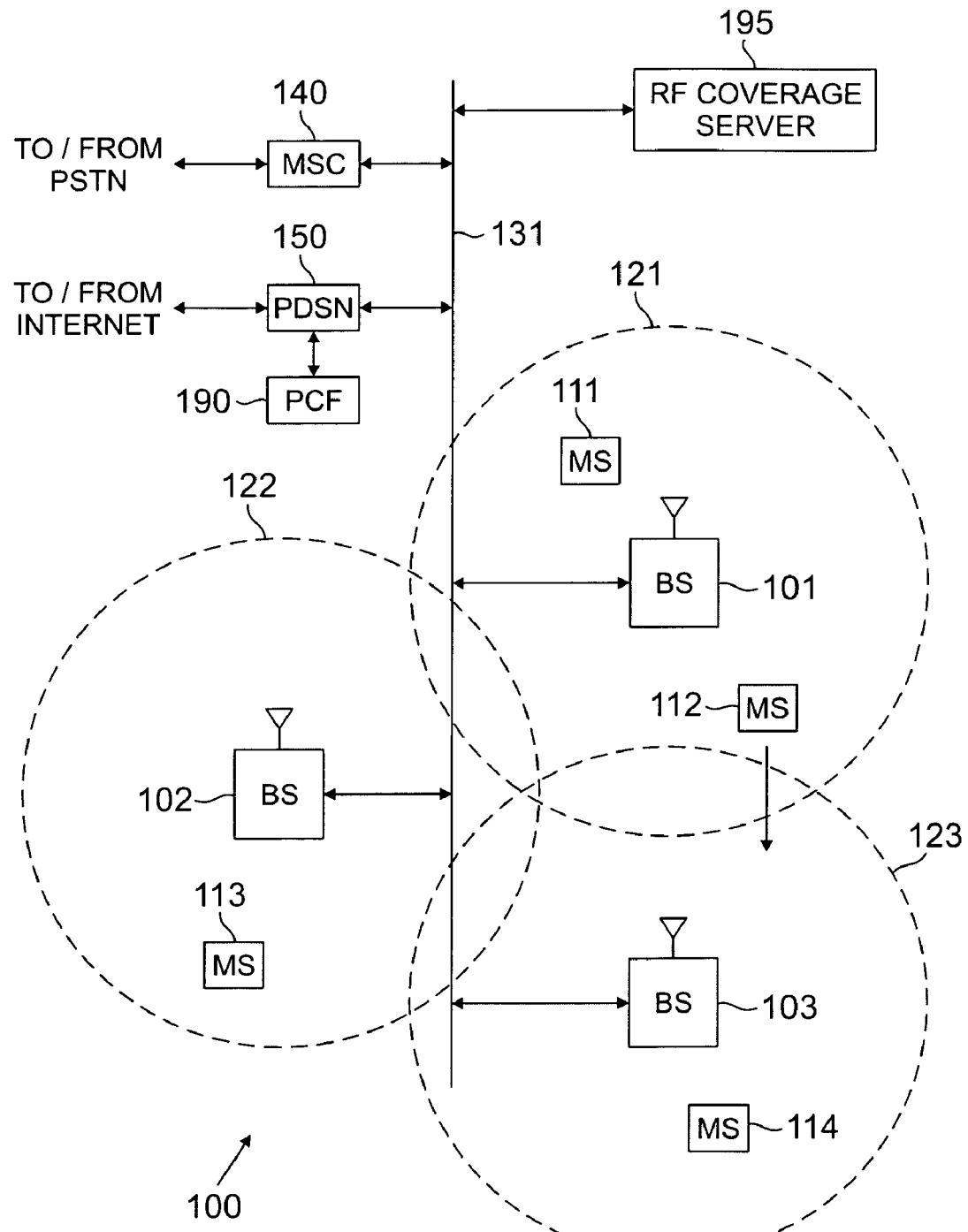
FIG. 1 illustrates an exemplary wireless network, in which apparatuses and methods according to the principles of the present invention may by used to optimize RF performance.

FIG. 1 illustrates exemplary wireless network 100, in which an apparatus and method according to the principles of the present invention may by used to optimize RF performance. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels according to the IS-2000-C standard (i.e., Release C of cdma2000). Mobile stations 111-114 may be any suitable wireless devices, including conventional cellular radiotelephones, PCS handset devices, personal digital assistants, portable computers, telemetry devices, and the like, which are capable of communicating with the base stations via wireless links. Wireless network 100 also comprises radio frequency (RF) coverage server 195, described below in greater detail.

The present invention is not limited to mobile devices. Other types of wireless access terminals, including fixed wireless terminals, may be used. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., monitoring devices with wireless capability).

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121-123 are comprised of a plurality of sectors (not shown), where a directional antenna coupled to the base station illuminates each sector. The embodiment of FIG. 1 illustrates the base station in the center of the cell. Alternate embodiments position the directional antennas in corners of the sectors. The system of the present invention is not limited to any particular cell site configuration.

In one embodiment of the present invention, BS 101, BS 102, and BS 103 comprise a base station controller (BSC) and at least one base transceiver subsystem (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystem in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of base stations 101-103, or as a stand-alone device that communicates with PDSN 150, as shown in FIG. 1. Line 131 also provides the connection path to transfer control signals between MSC 140 and BS 101, BS 102 and BS 103 used to establish connections for voice and data circuits between MSC 140 and BS 101, BS 102 and BS 103.

Communication line 131 may be any suitable connection means, including a T1 line, a T3 line, a fiber optic link, or any other type of data connection. The connections on line 131 may transmit analog voice signals or digital voice signals in pulse code modulated (PCM) format, Internet Protocol (IP) format, asynchronous transfer mode (ATM) format, or the like. According to an advantageous embodiment of the present invention, line 131 also provides an Internet Protocol (IP) connection that transfers data packets between the base stations of wireless network 100, including BS 101, BS 102 and BS 103. Thus, line 131 comprises a local area network (LAN) that provides direct IP connections between base stations without using PDSN 150.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102 or BS 103 to MSC 140.

In the exemplary embodiment of wireless network 100 illustrated in FIG. 1, MS 111 and MS 112 are located in cell site 121 and communicate with BS 101. MS 113 is located in cell site 122 and communicates with BS 102 and MS 114 is located in cell site 123 and communicates with BS 103. MS 112 is located close to the edge of cell site 123 and moves in the direction of cell site 123, as indicated by the direction arrow proximate MS 112. At some point, as MS 112 moves into cell site 123 and out of cell site 121, a handoff will occur.

As is well known to those skilled in the art, the handoff procedure transfers control of a call from a first cell to a second cell. A handoff may be either a soft handoff or a hard handoff. In a soft handoff a connection is made between the mobile station and the base station in the second cell before the existing connection is broken between the mobile station and the base station in the first cell. In a hard handoff the existing connection between the mobile station and the base station in the first cell is broken before a new connection is made between the mobile station and the base station in the second cell.

As MS 112 moves from cell 121 to cell 123, MS 112 detects the pilot signal from BS 103 and sends a Pilot Strength Measurement Message to BS 101. When the strength of the pilot transmitted by BS 103 and received and reported by MS 112 exceeds a threshold, BS 101 initiates a soft hand-off process by signaling the target BS 103 that a handoff is required as described in TIA/EIA IS-95 or TIA/EIA IS-2000.

BS 103 and MS 112 proceed to negotiate establishment of a communications link in the CDMA channel. Following establishment of the communications link between BS 103 and MS 112, MS 112 communicates with both BS 101 and BS 103 in a soft handoff mode. Those acquainted with the art will recognize that soft hand-off improves the performance on both forward (BS to MS) channel and reverse (MS to BS) channel links. When the signal from BS 101 falls below a predetermined signal strength threshold, MS 112 may then drop the link with BS 101 and only receive signals from BS 103. The call is thereby seamlessly transferred from BS 101 to BS 103. The above-described soft hand-off assumes the mobile station is in a voice or data call. An idle hand-off is the hand-off between cell sites of a mobile station that is communicating in the control or paging channel.

Figure 2:
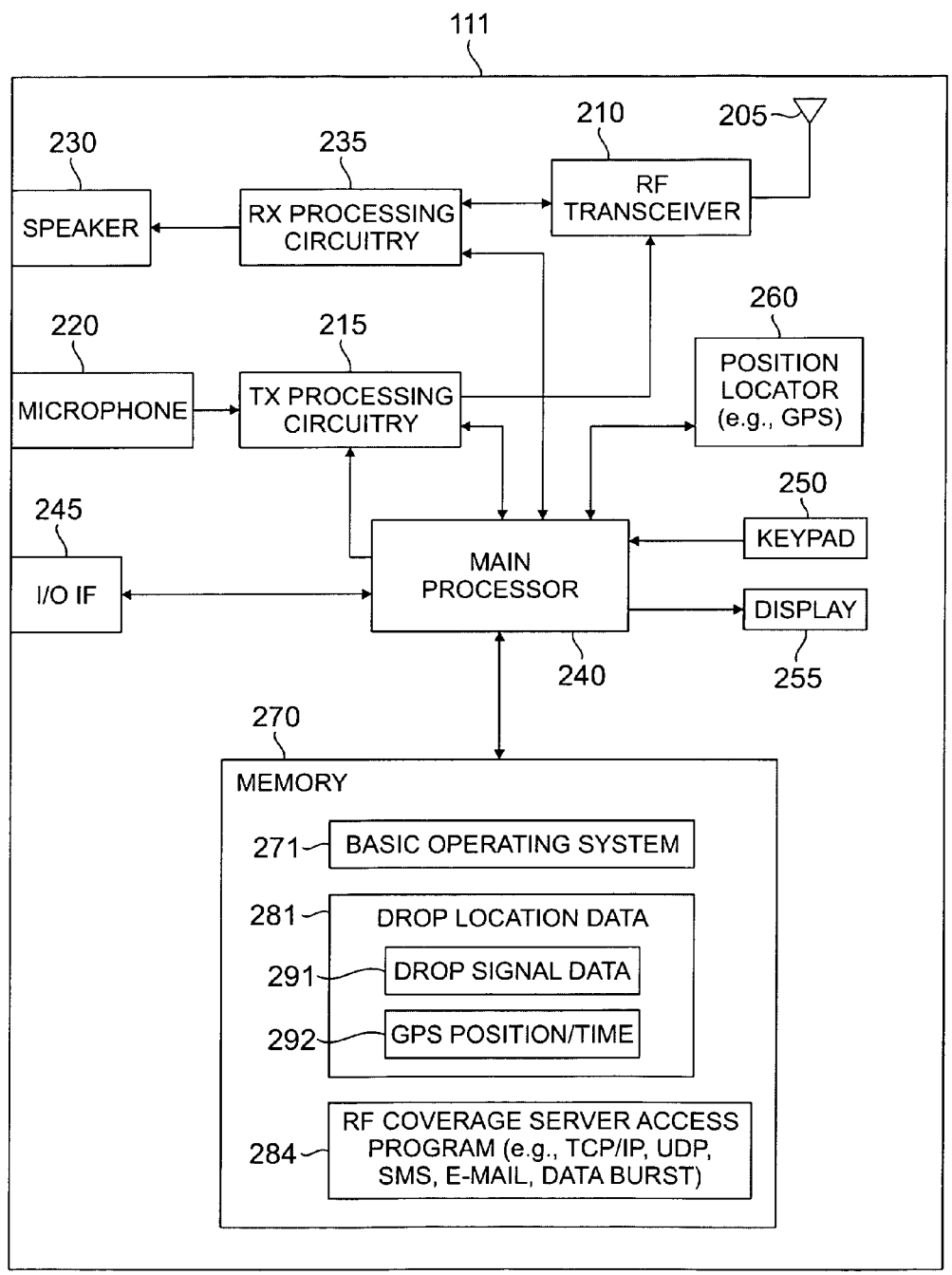
FIG. 2 illustrates an exemplary wireless mobile station in greater detail according to one embodiment of the present invention.

FIG. 2 illustrates exemplary wireless mobile station 111 in greater detail according to one embodiment of the present invention. Wireless mobile station 111 comprises antenna 205, radio frequency (RF) transceiver 210, transmitter (TX) processing circuitry 215, microphone 220, receiver (RX) processor circuitry 225, speaker 230, main processor 240, input/output (I/O) interface (IF) 245, keypad 250, display 255, and position locator 260, which may be, for example, a global positioning system (GPS) receiver. Wireless mobile station 111 further comprises memory 270, that stores basic operating system (OS) program 271, drop location data file 281 and RF coverage server access program 284. Drop location data file 281 comprises drop signal data field 291 and GPS position/time field 292.

Wireless mobile station 111 may be a cell phone, a personal digital assistant (PDA) device equipped with a wireless modem, a two-way pager, a personal communication system (PCS) device, or any other type of wireless mobile station.

RF transceiver 210 receives, from antenna 205, an incoming RF signal transmitted by a base station of a wireless communication network. RF transceiver 210 down-converts the incoming RF signal to produce an intermediate frequency (IF) or a baseband signal. The IF or baseband signal is sent to RX processing circuitry 225 that produces a processed baseband signal by filtering, decoding, and/or digitizing the baseband or IF signal to produce a processed baseband signal. RX processing circuitry 225 transmits the processed baseband signal to speaker 230 (i.e., voice data) or to main processor 240 for further processing (i.e., web browsing).

TX processing circuitry 215 receives analog or digital voice data from microphone 220 or other outgoing baseband data (i.e., web data, e-mail, interactive video game data) from main processor 240. TX processing circuitry 215 encodes, multiplexes, and/or digitizes the outgoing baseband data to produce a processed baseband or IF signal.

RF transceiver 210 receives the outgoing processed baseband or IF signal from TX processing circuitry 215. RF transceiver 210 up-converts the baseband or IF signal to an RF signal that is transmitted via antenna 205.

Main processor 240 may be implemented as a microprocessor or microcontroller. Main processor 240 executes basic OS program 271 in order to control the overall operation of wireless mobile station 111. In one such operation, main processor 240 controls the reception of forward channel signals and the transmission of reverse channel signals by RF transceiver 210, RX processing circuitry 225, and TX processing circuitry 215, in accordance with well known principles. Main processor 240 is also capable of controlling and/or interfacing with position locator 260 in order to transfer the location of MS 111 to memory 270.

Main processor 240 is capable of executing other processes and programs that are resident in memory 270. Main processor 240 can move data into or out of memory 270, as required by an executing process. Main processor 240 is also coupled to I/O interface 245. I/O interface 245 provides the mobile station with the ability to connect to other devices such as laptop computers and handheld computers. I/O interface 245 is the communication path between these accessories and main controller 240.

Main processor 240 is also coupled to keypad 250 and display unit 255. Keypad 250 is used by the end-user of the mobile station to enter data into the mobile station. Display 255, in the preferred embodiment, is a liquid crystal display capable of rendering text and/or at least limited graphics from Web sites. Alternate embodiments use other types of displays.

Memory 270 is coupled to main processor 240. Memory 270 may be comprised of solid-state memory such as random access memory (RAM), various types of read only memory (ROM), or Flash RAM. Memory 270 may also include other types of memory such as micro-hard drives or removable storage media that stores data. Memory 270 stores basic operating system program 271 that provides the basic operational control of mobile station 111. Drop location data file 281 stores the location, time and RF signal parameters of mobile station 111 at the time that service and/or a call was dropped. When a connection to wireless network 100 is dropped, basic operating system program 271 immediately stores in GPS position/time field 292 the last location of MS 111 and immediately stores in drop signal data field 291 certain RF signal parameters associated with forward channel signals from the dropped base station.

Memory 270 also stores RF coverage server access program 284, which enables MS 111 to transfer position data and RF signal data to RF coverage server 195 in FIG. 1. RF coverage server access program 284 may be an e-mail program, a Transmission Control Protocol/Internet Protocol (TCP/IP) program, a User Datagram Protocol (UDP) program, a short messaging service (SMS) program, a CDMA data burst program, or any combination of these programs. These various types of communication programs are for illustration purposes only. The present invention is not limited to any one type or combination of server access programs.

Figure 3:
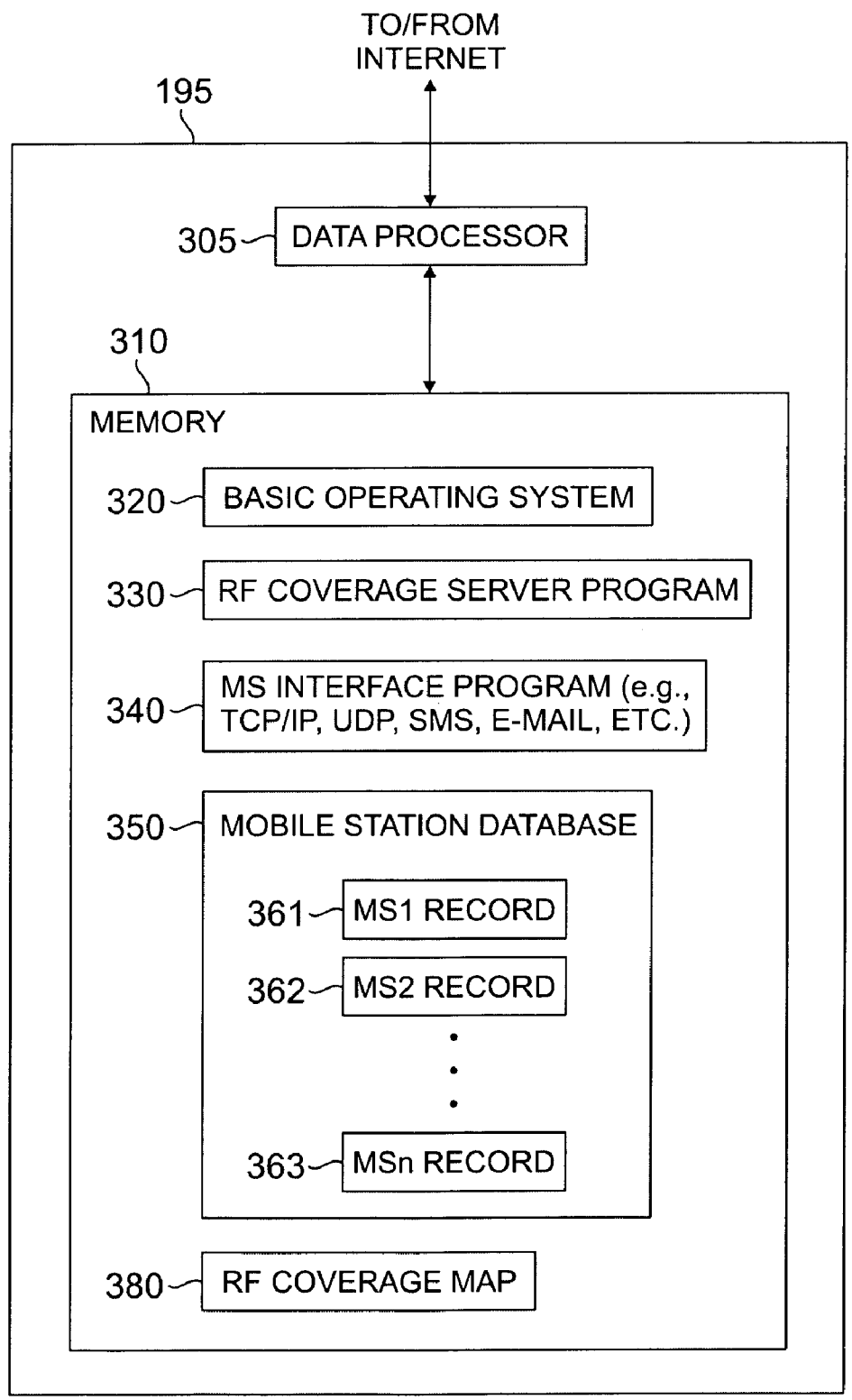
FIG. 3 illustrates an exemplary RF coverage server according to one embodiment of the present invention.

FIG. 3 illustrates exemplary radio frequency (RF) coverage server 195 in greater detail according to one embodiment of the present invention. RF coverage server 195 comprises data processor 305 and memory 310. Data processor 305, in one embodiment, is a microprocessor or microcontroller. Other embodiments use other types of controllers, such as parallel processors, for greater processing power. Data processors are well known in the art and are not discussed further.

Memory 310 may comprise solid-state memory, such as random access memory (RAM), various types of read-only memory (ROM), or Flash RAM. Memory 310 may also include other types of memory, such as micro-hard drives or removable storage media, that store data.

Memory 310 is coupled to data processor 305 and stores basic operating system program 320, RF coverage server program 330, mobile station interface (IF) program 340, mobile station database 350, and RF coverage map 380. Mobile station database 350 contains N mobile station records, including exemplary mobile station records 361, 362 and 363, which are arbitrarily labeled MS1 Record, MS2 Record, and MSn Record, respectively. Exemplary mobile station record 361 stores the geographic location and time information and RF signal data for a particular mobile station (e.g., MS 111). Exemplary mobile station records 362 and 363 contain similar data fields.

Basic operating system 320 is run by data processor 305 in order to control the overall operation of the location server. RF coverage server program 330 is responsible for securely gathering location information from mobile stations that have dropped calls or lost service and generating therefrom RF coverage map 380, which identifies RF coverage holes in wireless network 100. According to one embodiment of the present invention, RF coverage map 380 may be a simple two dimensional map showing dots, squares, or other icons that represent the locations of mobile stations at the time of a service loss or call drop. The map may illustrate drop location data gathered over an entire extended time period, such as a month, a week, or a day.

Alternatively, RF coverage map 380 may comprise multiple two dimensional maps for certain times of day, such as a first map that shows drop location data for the time period between 12 AM and 1 AM on a particular day, a second map that shows drop location data for the time period between 1 AM and 2 AM on the same day, a third map that shows drop location data for the time period between 2 AM and 3 AM on the same data, and so forth. Also, the maps may cover multiple days. For example, the first map may show drop location data for the time period between 12 AM and 1 AM for every day for an entire month.

Mobile station IF program 340 communicates with RF coverage server access program 284 in MS 111 in order to receive drop location data from MS 111. Mobile station IF program 340 may comprise an e-mail program, a Transmission Control Protocol/Internet Protocol (TCP/IP) program, a User Datagram Protocol (UDP) program, a short messaging service (SMS) program, or any combination of these programs. These various types of communication programs are for illustration purposes only. The present invention is not limited to any one type or combination of server access programs.

According to an advantageous embodiment of the present invention, MS 111 relays to RF coverage server 195 exact location and time information of MS 111 and selected forward channel RF signal measurements in the event of a call drop or a service loss. The location and time information are retrieved from GPS position/time field 292 and the RF signal parameters are retrieved from drop signal data field 291.

According to the principles of the present invention, MS 111 may implement RF threshold based reporting techniques to report failures to RF coverage server 195. RF performance related thresholds for reporting may be set based on the location of MS 111 or an event (e.g., FER rate lower than a predetermined minimum threshold, strongest pilot, pilot stronger than a predetermined threshold, dropped call rates, and the like). Event-based reporting may also include, for example, loss of the Paging channel or a traffic channel. Upon loss of the Paging or traffic channel, MS 111 stores the most recent RF signal parameter values for subsequent reporting back to the base station.

According to an advantageous embodiment of the present invention, the mobile station data and signal parameters that MS 111 stores in drop signal data field 291 and GPS position/time field 292 may comprise MSID (IMSI+ESN), CDMA_CH, SID, NID, latitude (MS_LAT), longitude (MS_LON), and system time (MS_LOC_TSTAMP) from the most recent power up, latitude, longitude and time stamp information at the time the call was dropped, Reference Pilot PN Offset, Ec/Io, Position in chips, receive power (Rx_Pwr), Active Set Pilot_PN Offsets, Candidate Set Pilot_PN Offsets, Neighbor Set Pilot PN Offsets, and Search/Finger Information (Search State, Finger PN, Ec/Io, Position in Chips).

RF coverage server program 330 combines the event-driven reports from mobile stations 111-114 with generally available data (terrain, roads, population concentration areas, etc.) and built-in algorithms to determine how much of the content in the reports from MS 111-MS 114 can be used as is. For example, the last PN_Offset which MS 111 was locked on to prior to loss of paging channel event may be used with minimal processing to generate geographical and historical reports in RF coverage map 380 that show the boundary of the paging channel and frequency of mobile stations losing lock for any of the base stations and their individual sectors. Likewise, the last PN_Offsets in the Active Set, Candidate Set, and Neighbor Set in the mobile station just prior to call drop may be used with minimal processing to build geographical and historical report that shows the boundaries of traffic channel.

It is important to note that RF coverage server program 330 may take automatic corrective actions if the base stations of wireless network 100 comprise electronically tunable antennas. This would greatly increase the effectiveness of the present invention because site visits by technicians become unnecessary and the results can be seen almost instantly. This feature would also allow the service provider to change the RF characteristics of wireless network 100 as the daily traffic changes.

The present invention addresses all of the problems associated with the prior art methods. Measurements are taken in a real system under normal operation. These measurements are very fast (even real-time) and very cheap and provide a system-wide view. Both good and bad RF coverage areas can be identified. Scheduled maintenance visits to the sites become unnecessary. The present invention does not rely on a multitude of hardware alarms and sensors in the infrastructure equipment. It is capable of monitoring every part of the system since all of the users of the system become part of the monitoring process. The present invention also anticipates customer complaints. If persistent error reports come from a particular mobile station in good coverage areas, then that mobile station may be recalled and replaced using a Mobile Device Recall (MDR) system.

Figure 4:
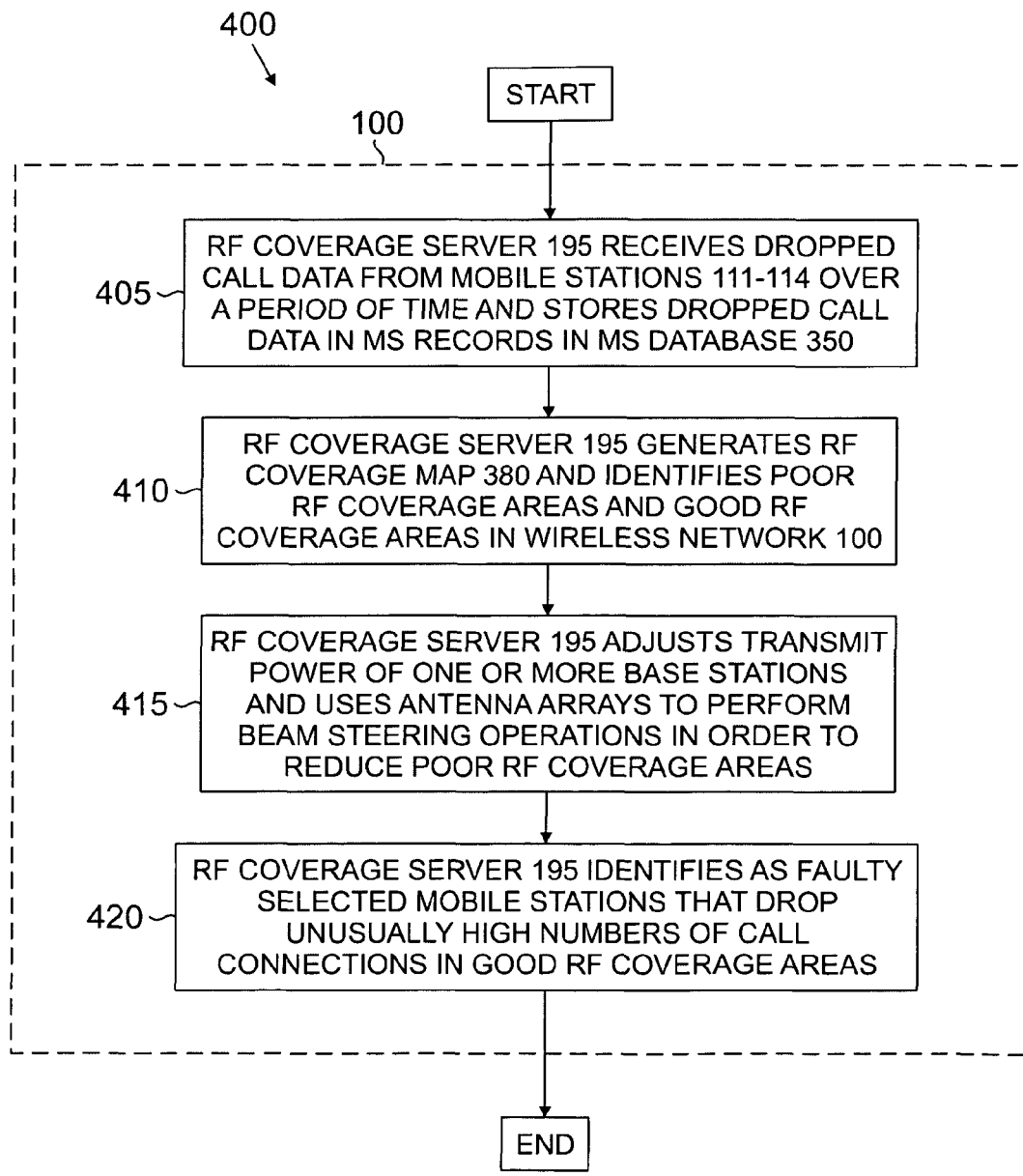
FIG. 4 is a flow diagram illustrating the operation of the present invention.

FIG. 4 depicts flow diagram 400, which illustrates the operation of the present invention. Over a period of time, RF coverage server 195 receives dropped call data from mobile stations 111-114 and stores the received dropped call data in the mobile station records in MS database 350 (process step 405). RF coverage server 195 also generates RF coverage map 380 and identifies areas of poor RF coverage as well as areas of good RF coverage in wireless network 100 (process step 410). In order to reduce area of poor RF coverage, RF coverage server 195 may adjust the transmit power of one or more base stations and may use electronic antenna arrays associated with the base stations to perform beam steering operations (process step 415). Finally, RF coverage server 195 may identify as faulty selected mobile stations that drop unusually high numbers of call connections in good RF coverage areas (process step 420). RF coverage server 195 may automatically generate data messages that may be transmitted to the faulty mobile stations informing the users that their mobile stations are defective and should be repaired or replaced. Alternatively, RF coverage server 195 may automatically notify customer service personnel at the service provider of the identities of the faulty mobile stations. The service provider may then use mail, e-mail or phone calls to notify its customers.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in association with a wireless network comprising a plurality of base stations capable of communicating with mobile stations located in a coverage area of said wireless network, a radio frequency (RF) coverage server capable of receiving from said mobile stations geographic location data indicating positions of said mobile stations when communication links to said wireless network were dropped, wherein said RF coverage server is capable of identifying areas of good RF coverage and areas of poor RF coverage in said wireless network and wherein said RF coverage server is further capable of identifying a first one of said mobile stations that frequently drops communication links to said wireless network when said first mobile station is disposed outside of said poor RF coverage areas.

2. The RF coverage server as set forth in claim 1 wherein said RF coverage server determines that said first mobile station is faulty.

3. The RF coverage server as set forth in claim 2 wherein said RF coverage server transmits an alert message to said first mobile station informing a user of said first mobile station that said first mobile station is faulty.

4. The RF coverage server as set forth in claim 2 wherein said RF coverage server transmits an alert message to an operator of said wireless network informing said operator that said first mobile station is faulty.

5. The RF coverage server as set forth in claim 2 wherein said RF coverage server adjusts a transmit power of a first base station to reduce a size of a first one of said poor RF coverage areas.

6. The RF coverage server as set forth in claim 2 wherein said RF coverage server adjusts transmit powers of a first base station and a second base station to reduce a size of at least one of said poor RF coverage areas.

7. The RF coverage server as set forth in claim 2 wherein said RF coverage server adjusts an electronic antenna of a first base station to perform beam steering in order to reduce a size of a first one of said poor RF coverage areas.

8. The RF coverage server as set forth in claim 2 wherein said RF coverage server adjusts electronic antennas of a first base station and a second base station to perform beam steering in order to reduce a size of at least one of said poor RF coverage areas.

9. A wireless network comprising:
a plurality of base stations capable of communicating with mobile stations located in a coverage area of said wireless network; and a radio frequency (RF) coverage server capable of receiving from said mobile stations geographic location data indicating positions of said mobile stations when communication links to said wireless network were dropped, wherein said RF coverage server is capable of identifying areas of good RF coverage and areas of poor RF coverage in said wireless network and wherein said RF coverage server is further capable of identifying a first one of said mobile stations that frequently drops communication links to said wireless network when said first mobile station is disposed outside of said poor RF coverage areas.

10. The wireless network as set forth in claim 9 wherein said RF coverage server determines that said first mobile station is faulty.

11. The wireless network as set forth in claim 10 wherein said RF coverage server transmits an alert message to said first mobile station informing a user of said first mobile station that said first mobile station is faulty.

12. The wireless network as set forth in claim 10 wherein said RF coverage server transmits an alert message to an operator of said wireless network informing said operator that said first mobile station is faulty.

13. The wireless network as set forth in claim 10 wherein said RF coverage server adjusts a transmit power of a first base station to reduce a size of a first one of said poor RF coverage areas.

14. The wireless network as set forth in claim 10 wherein said RF coverage server adjusts transmit powers of a first base station and a second base station to reduce a size of at least one of said poor RF coverage areas.

15. The wireless network as set forth in claim 10 wherein said RF coverage server adjusts an electronic antenna of a first base station to perform beam steering in order to reduce a size of a first one of said poor RF coverage areas.

16. The wireless network as set forth in claim 10 wherein said RF coverage server adjusts electronic antennas of a first base station and a second base station to perform beam steering in order to reduce a size of at least one of said poor RF coverage areas.

17. For use in association with a wireless network comprising a plurality of base stations capable of communicating with mobile stations located in a coverage area of the wireless network, a method of optimizing the radio frequency (RF) coverage of the wireless network comprising the steps of:
   receiving in a RF coverage server geographic location data transmitted by the mobile stations indicating positions of the mobile stations when communication links to the wireless network were dropped;
   identifying in the RF coverage server areas of good RF coverage and areas of poor RF coverage in the wireless network; and
   identifying in the RF coverage server a first one of the mobile stations that frequently drops communication links to the wireless network when the first mobile station is disposed outside of said poor RF coverage areas.

18. The method as set forth in claim 17 further comprising the step of determining in the RF coverage server that the first mobile station is faulty.

19. The method as set forth in claim 18 further comprising the step of transmitting from the RF coverage server an alert message to the first mobile station informing a user of the first mobile station that the first mobile station is faulty.

20. The method as set forth in claim 19 further comprising the step of transmitting from the RF coverage server an alert message to an operator of the wireless network informing the operator that the first mobile station is faulty.

\* \* \* \* \*